June 9, 1942.  H. C. KEYSER  2,285,520
PORTABLE MILK COOLER
Filed June 30, 1941  2 Sheets-Sheet 1
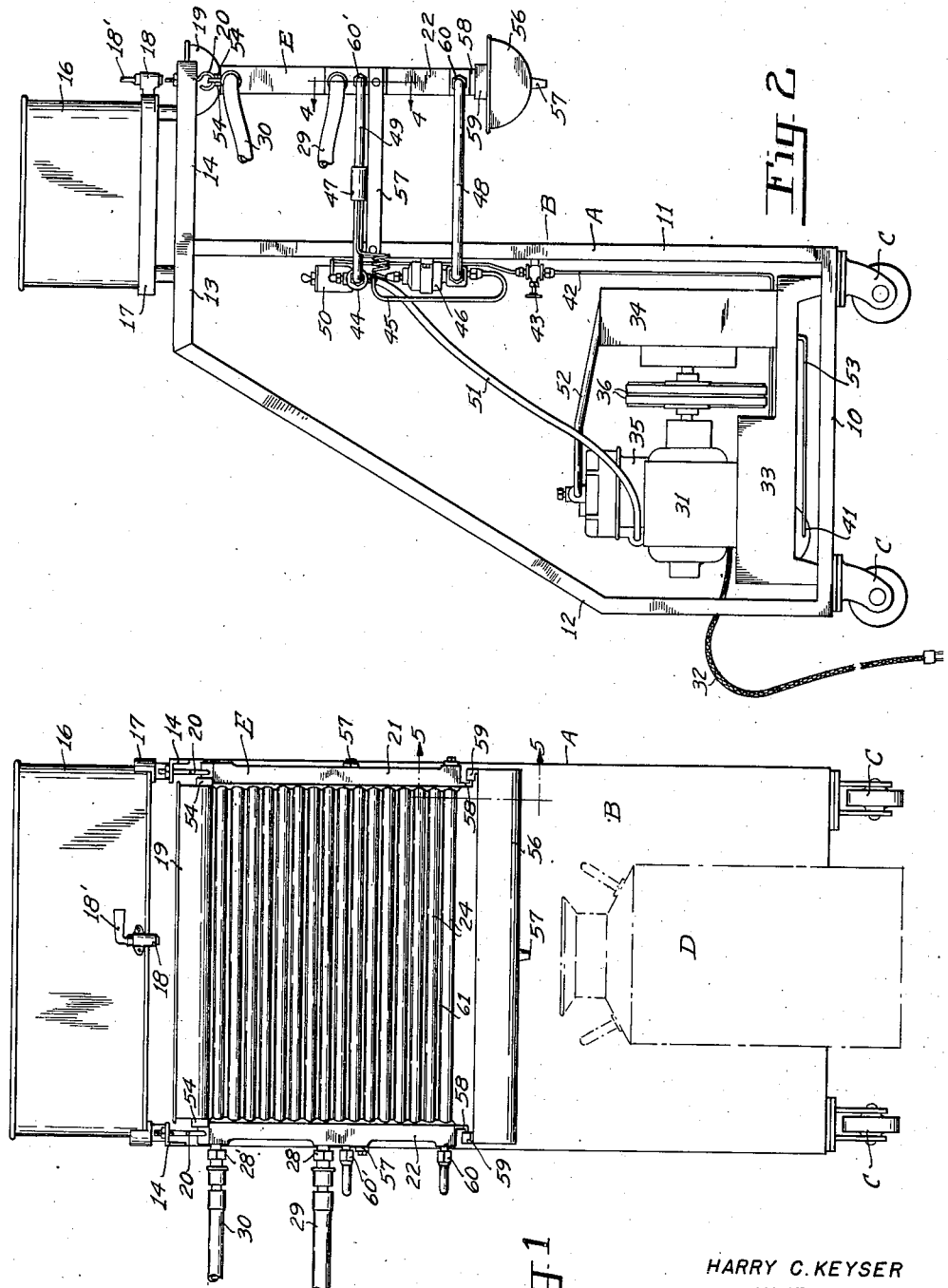
HARRY C. KEYSER
INVENTOR

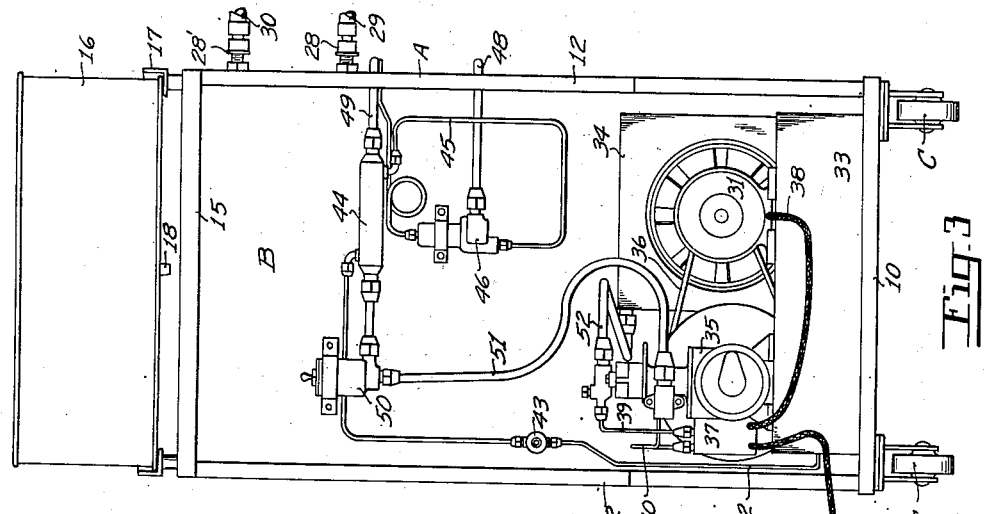

Patented June 9, 1942

2,285,520

UNITED STATES PATENT OFFICE 2,285,520

PORTABLE MILK COOLER

Harry C. Keyser, Portland, Oreg.

Application June 30, 1941, Serial No. 400,523

2 Claims. (Cl. 62—141)

This invention relates to means for cooling fresh milk on farms, where the milk is required to be kept several hours, or overnight, before delivery to milk distributing centers.

Mechanical refrigeration for cooling and storing milk on farms has increased rapidly in recent years, with the increased availability of electricity for farm use, and with the increased requirements for milk cooling set up by health boards; and various types of mechanical coolers and refrigerating devices have been developed for this purpose.

One objection to most of the coolers at present in use for this purpose is the fact that the large cans in which the milk is transported from the farms, and which are quite heavy when filled with milk, have to be lifted into and out of the coolers, and this lifting of the heavy cans is work which is hardly suitable for women employees on the farm.

Another general objection to ordinary mechanical coolers is the fact that the number of cans of milk requiring cooling or refrigeration will vary from time to time; thus the number may be twice as great in the morning, when the milk from both evening and morning milking is being kept on hand pending the arrival of the milk truck, as in the evening; consequently a cooler large enough to meet the morning requirements will be larger than necessary for the requirements at other times, assuming that the milk is collected each morning, and will thus result in the consumption of more power than necessary at all other times. Another related difficulty with such coolers is the fact that the morning's milk usually has to be cooled more rapidly than the evening's milk, the cooling of the latter being allowed to take place over a period of several hours.

It has been discovered however, that if the milk is cooled sufficiently, immediately after milking, and kept in the large cans in which it is customarily transported, it will retain a satisfactorily low temperature for several hours, and may be kept overnight in this way, so that no further cooling or refrigeration will be necessary until it is delivered to the milk distributing center.

One of the objects of this invention is to provide a simple, practical cooler of the type in which immediate cooling of the milk to a predetermined temperature is possible, so that further storage of the cooled milk in a cooler or refrigerator will be unnecessary for several hours.

Another and important object of this invention is to provide a cooler in which no lifting of heavy milk cans is necessary, and a cooler which will be especially adapted to be moved about from place to place in the barn or dairy, so that, as each pail is filled with milk during the milking, the pail can be conveniently emptied directly into the cooler, thus minimizing the labor required on the part of the persons engaged in the milking.

A further object is to provide a simple portable cooler of the type above indicated which will be comparatively inexpensive to manufacture, economical to operate, and which will be automatic in its operation and in controlling the cooling, while insuring the proper reduction of temperature of the fresh milk under all conditions.

These and incidental objects I attain by constructing my portable milk cooler in the manner hereinafter to be briefly described.

In the description reference is made to the accompanying drawings in which:

Figure 1 is a front elevation of my device with the milk can for receiving the cooled milk shown in broken lines;

Figure 2 is a side elevation of my device;

Figure 3 is a rear elevation;

Figure 4 is a fragmentary sectional front elevation of the cooling coils, the section being taken on the line 4—4 of Figure 2 but drawn to a larger scale;

Figure 5 is a transverse section of the milk collecting trough and a fragmentary sectional elevation of the lower portion of the cooling unit, corresponding to the line 5—5 of Figure 1 but drawn to a larger scale;

Figure 6 is a fragmentary end perspective of the top milk-distributing trough; and Figure 7 is a fragmentary enlarged transverse sectional view of a portion of the top milk-distributing trough.

Referring first to Figures 2 and 3, my device includes a frame A consisting of a rectangularly-formed base portion 10, to which are attached a pair of front straight uprights 11 and a pair of rear bent uprights 12. Horizontal top frame members 13 are joined to the upper extremities of the pairs of uprights 11 and 12 and are connected at the rear by the horizontal cross-member or brace 15. The top frame members 13 extend forwardly so as to overhang the front face of the main frame body, as shown at 14 in Figure 2, and a face plate B is secured to the front uprights 11. The entire frame is mounted on swivel castors or wheels C which are so mounted and arranged that the device can easily be wheeled about from place to place.

An open milk-receiving tank 16 is removably supported in an angle frame 17, which frame in turn is firmly secured to and mounted on the top members 13. The tank 16 has a discharge spout 18 at the front, with a manual control 18' therefor, enabling the discharge of milk from the receiving tank 16 to be regulated as desired.

A cooling coil element E, having corrugated surfaces for its two faces, and provided with suitable cooling tubes, as hereinafter described, is suspended from the overhanging portions 14 of the top frame members 13 by eyebolts 20. The cooling element E is also removably attached at the sides to the front ends of a pair of bars 57, the rear ends of these bars 57 being attached to the uprights 11, respectively.

A distributing trough 19 is placed at the top of the cooling element E and is retained in proper position therein by a pair of ears 54 at each end of the trough 19 (see Figure 6), which ears straddle the inner edges of lugs to which the suspending eyebolts 20 are attached. The bottom of the trough 19 is formed with a series of discharging ports 55 (see Figure 7), which ports are in longitudinal alinement with the cooling tubes of the element E, so that the milk passing into the trough 19 from the milk-receiving tank 16 will be distributed along the entire extent of the top surface of the cooling element E and will flow down evenly over both corrugated faces of the cooling element. These discharging ports 55 of the trough 19 are preferably formed, as shown in Figure 7, by punching the metal of the trough outwardly so as to insure that the milk will be delivered directly on the center of the top of the cooling element E.

At the bottom of the cooling element E a milk collecting trough 56 is attached. This trough 56 has a discharging outlet or spout 57 which is centrally located, through which the milk from the cooler is finally discharged, or, if desired, may be provided with several discharge spouts. When the cooler is to be used the milk can D to be filled is placed under the trough 56 so that the cooled milk, discharged from the trough, will pass into the milk can D.

The collecting trough 56 is formed with a lip or socket 59 at each end at the top, and each of these sockets 59 is adapted to engage a suspending angle bracket 58 extending downwardly from the end members of the cooling coil element E. These sockets 59, as will be apparent from Figure 5, are so formed that they prevent the trough 56 from slipping off the suspending angle brackets 58, but permit the trough 56, when lifted slightly at each end, to be easily removed from these brackets 58.

The cooling element E is divided into two compartments or coolers entirely separated from each other. The upper compartment is adapted for the circulation of cold water, while the lower compartment is adapted to have a refrigerant circulated therethrough. The structure of the cooling element E is shown in Figures 1 and 4. This element includes end or side members 21 and 22, each of which has a vertical wall on three sides and is formed with interior horizontal partitions 26 dividing it into a series of vertical chambers 25. The horizontal partitions of the two members 21 and 22 are staggered with respect to each other, as shown in Figure 4. The end member 22 has an additional horizontal partition 23 located at the same level as a corresponding partition 23' in the member 21, and these two partitions serve to separate the upper compartment or coil from the lower compartment of the element. A plurality of horizontal tubes 24 have their ends sealed in the end members 21 and 22, and the arrangement is such that these tubes, in combination with the chambers 25 of the end members constitute circulating coils, as indicated in Figure 4.

In each of the two compartments, into which the cooling element E is divided, the cooling fluid, whether water or refrigerant, enters the compartment at the bottom, passes upwardly through the coils of the compartment, and is withdrawn from the top of the compartment. Thus cold water for the upper compartment enters through a coupling 28 (Figure 1), screwed into a threaded inlet port 27 (Figure 4) in the member 22, and passes out through a similar coupling 28' (Figure 1) at the top of the compartment. A hose 29 connects the coupling 28 with the faucet or pipe line from which the cold water is obtained, and another hose 30 connects the coupling 28' with any suitable drain for carrying off the used water.

Similarly the refrigerant enters the lower compartment through a coupling 60, passes upwardly through the coils of this compartment, and leaves through the coupling 61 in its return to the compressor.

The refrigerant used may be a dehydrated gas, such as "Freon," and the mechanism employed for the refrigerating system is more or less standard equipment. A motor 31 (Figure 2) mounted on a base 33, drives the usual fan in the cooling coil or condensing unit 34, and also operates a compressor 35, connected to the motor by suitable pulleys and belts 36. A pressure-controlled switch 37 (Figure 3) is adapted to be connected with any suitable electric outlet by a plug-in cord 32, and this switch in turn connects with the motor 31 through conductor 38. A high-pressure pipe line 39 connects the pressure switch 37 with the high-pressure side of the compressor 35, and another pipe line 40 connects this switch with the low or vacuum side of the compressor.

The refrigerant is stored in a supply tank 41 located beneath the base 33, and travels through a feed line 42 and manually-adjustable valve 43 to a heat exchanger 44. From this heat exchanger 44 the refrigerant passes through pipe line 45, through a thermally-controlled expansion valve 46 and pipe line 48, into the bottom of the lower compartment of the cooling coil element E. The liquid refrigerant expands into a gas as it passes upwardly through the cooling coils of the cooling element E, and finally leaves the cooling element E through pipe 49. The returning gas passes through heat exchanger 44, pressure-regulating valve 50 and pipe line 51, into the compressor 35. Then the gas passes through pipe 52 into the cooling coils of the condensor unit 34, the resulting liquid refrigerant finally being returned to the supply tank 41 through the pipe 53.

In the heat exchanger 44 the liquid refrigerant on its way to the cooling element E passes through coils (not shown) located wtihin the exchanger and is partially expanded by the heat from the gas returning to the compressor from the cooling element E. The liquid refrigerant in the heat exchanger 44 also cools the incoming gas to a slight extent, and, to this extent, assists the compressor unit in its work.

The expansion valve 46 is controlled by an expansion bulb 47 (Figure 2) which is in direct contact with the expanded gas returning from the cooling element E through the pipe 49. Increase in the temperature of the returning gas causes the expansion valve 46 to open wider and thereby to permit a larger amount of refrigerant to pass into the cooling element E. Similarly, a reduction in the temperature of the returning gas through pipe 49 causes the valve 46 to shut down and reduce the amount of refrigerant permitted to pass into cooling element E. In this way the amount of refrigerant required in the cooling element E is automatically controlled.

The pressure-control switch 37 will shut off the current to the motor when the pressure in the high side of the compressor is reduced below a predetermined amount and, similarly, will operate to connect the current to the motor as soon as the pressure increases to this amount or rises above it.

In the operation of my device, the warm milk poured from milk buckets into the receiving tank 16, is permitted to pass into the distributing trough 19, from whence it flows down over the front and rear corrugated surfaces of the cooling element E. In its passage downward over these surfaces the warm milk is first cooled slightly by the cooling coils of the water circulating through the upper compartment of the cooling element E, and this cooling is completed and the milk reduced to the desired low temperature as the milk passes over the lower compartment in which the coils of the refrigerant are located.

The use of cold water in the upper compartment reduces the amount of cooling required to be done by the refrigerant. The corresponding surface areas cooled by the water and by the refrigerant can of course be modified, depending upon local conditions, etc., and the use of water can even be dispensed with entirely and the cooling done by the refrigerant alone, if it is so desired. However, since a plentiful supply of cold running water is generally available in all farms and dairies, large or small, the use of both cooling water and the refrigerant, in my device in the manner described, I consider to be preferable.

It is desirable that the milk should not be cooled to any lower temperature than that actually required for properly keeping the milk, since further cooling serves no purpose. It is also desirable that the refrigerating mechanism should operate only to the extent required for the proper cooling of the milk and should operate only during the time that milk continues to pass over the cooler surfaces, since further operation would merely result in an accumulation of ice on the cooling surfaces of the lower compartment and in a waste of electric energy.

Automatic control of the amount of the cooling of the milk and also control of the operation of the motor in my device is accomplished by the thermal expansion valve 46 in conjunction with the pressure-controlled switch 37. When the milk ceases to pass down over the cooling element E the temperature of the gas returning through pipe 49 to the compressor will be lowered until the valve 46 finally shuts off further supply of liquid refrigerant to the cooling element E. But when this happens the pressure on the high side of the compressor will be reduced, as a vacuum is built up on this side of the compressor, and this will cause the pressure switch 39 to cut off the power and stop the motor. When further milk is started down over the cooling element E, the warm milk raises the temperature of the gas in the coils and in pipe 49 which immediately causes valve 46 to open to permit more liquid refrigerant to pass into the coiling coils in element E. The expansion of this additional refrigerant in the cooling coils, however, builds up pressure in the system and on the high side of the compressor, which pressure causes the pressure-switch 37 to close the contact and start the motor operating.

Thus all that is required for the operation of my device is to plug the cord 32 into a suitable electric outlet, and, if water is also to be used for cooling, to connect a hose to the water supply. The operation then becomes entirely automatic.

The cooler may easily be moved about from place to place and used at any time wherever suitable electric and water connections are available, and the connecting hoses 29 and 30 and the electric cord 32 can be made any length desired.

The various parts of my device with which the milk comes in contact are easily cleaned and the distributing and receiving troughs, as well as the milk-receiving tank, are easily removed for this purpose, when the cooler is not being used. I have found that it is most practical and efficient to have the corrugated surfaces for the cooler formed by the coils or tubes 24 themselves, without any additional outside walls, the adjacent tubes being joined by centrally located vertical walls or baffles 61 (Fig. 4).

The important feature of my device is the fact that it renders the lifting and moving of heavy cans of milk unnecessary except when the filled cans are finally moved to the location where they are to be picked up by the delivery truck; and, by moving my device about from place to place, when the milking is being done, even the distances which the full pails of milk have to be carried is greatly reduced. Thus a considerable saving in the manual work connected with the cooling and refrigerating of fresh milk is made possible.

Various modifications could be made in my device without departing from the principle of my invention. Thus different types of automatically-controlled refrigerating units might be satisfactorily employed. It is necessary, however, in order to carry out my object, that the cooler be so arranged as to be easily moved or shoved about from place to place, and that it be so constructed that ordinarily-sized milk cans may be slid into position below its discharging spout.

I claim:

1. In a milk cooler of the character described, a frame, said frame having a top, the top extending horizontally beyond the front of said frame so as to overhang said front, a cooling coil element removably suspended from the overhanging portion of said top and spaced from said front, said cooling coil element having horizontally corrugated surfaces for its two faces with cooling pipes located therebetween, a milk-receiving tank supported above said top, a distributing trough removably supported above said cooling coil element and adapted to distribute milk over the surfaces of said cooling coil element at the top, said milk-receiving tank having a spout discharging into said distributing trough, a collecting trough removably suspended from the bottom of said cooling coil element, a mechanical refrigerating unit mounted in said frame, means connected with said refrigerating unit for circulating refrigerant in said cooling coil element, said means including a pressure switch and an expansion valve and an automatic control for regulating the delivery of refrigerant to said cooling coil element in accordance with the milk cooling required, whereby, when milk is permitted to pass from said receiving tank into said distributing trough and thence to flow downwardly over the corrugated surfaces of said cooling coil element, the milk will be cooled by passing over said cooling coil element before being collected in said bottom collecting trough, and whereby said pressure switch and expansion valve and control means will insure predetermined amount of cooling of the milk but prevent unnecessary cooling of said cooling coil element, supporting wheels mounted on the base of said frame to permit said cooler to be moved easily about, a discharge spout in said bottom-collecting trough, said cooler being of proper size and heighth to permit said collecting trough to be supported at a heighth from the ground slightly in excess of the heighth of a conventional-size milk can, whereby said cooler can be moved into and out of position with respect to the milk can without requiring any unnecessary moving of the milk can.

2. In a milk cooler of the character described, a frame, the front of said frame being vertical, said frame having a top, the top extending horizontally beyond said front so as to overhang said front, a cooling coil element suspended from the overhanging portion of said top parallel to and spaced from said front, said cooling coil element having horizontally corrugated surfaces for its two faces with cooling pipes located therebetween, said pipes extending horizontally and arranged one above the other in vertical alinement, a milk-receiving tank removably supported above said top, a distributing trough removably supported above said cooling coil element and adapted to distribute milk over the surfaces of said cooling coil element at the top, said milk-receiving tank having a manually-controlled spout discharging into said distributing trough, a collecting trough removably suspended from the bottom of said cooling coil element, said cooling coil element having an upper compartment and a lower compartment with a separate cooling coil in each department, an inlet and outlet for the coil in said upper compartment, means for connecting said inlet to a source of fresh cold water and means for connecting said outlet to a suitable water drain, a mechanical refrigerating unit mounted in said frame, means connected with said refrigerating unit for circulating refrigerant in the lower compartment of said cooling coil element, said means including a pressure switch and an expansion valve and an automatic control for regulating the delivery of refrigerant to the lower compartment of said cooling coil element in accordance with the milk cooling required, whereby, when milk is permitted to pass from said receiving tank into said distributing trough and thence to flow downwardly over the corrugated surfaces of said cooling coil element, the milk will first be partially cooled by passing over the surfaces adjacent the cold water coil in said upper compartment and then have the cooling completed in passing over the lower surfaces adjacent the refrigerant coil of the lower compartment before being collected in said bottom collecting trough, and whereby said pressure switch and expansion valve and control means will insure predetermined amount of cooling of the milk but prevent unnecessary cooling of said cooling coil element, supporting wheels mounted on the base of said frame to permit said cooler to be moved easily about, a discharge spout in said bottom-collecting trough, said cooler being of proper size and heighth to permit said collecting trough to be supported at a heighth from the ground slightly in excess of the heighth of a conventional-size milk can.

HARRY C. KEYSER.